(12) United States Patent
Chamberlin et al.

(10) Patent No.: US 9,130,434 B2
(45) Date of Patent: Sep. 8, 2015

(54) INDUCTION ROTOR END RING SUPPORT DEVICE

(75) Inventors: Bradley D. Chamberlin, Pendleton, IN (US); Andrew Worley, Noblesville, IN (US)

(73) Assignee: Remy Technologies, LLC, Pendleton, IN (US)

( * ) Notice: Subject to any disclaimer, the term of this patent is extended or adjusted under 35 U.S.C. 154(b) by 416 days.

(21) Appl. No.: 13/363,860

(22) Filed: Feb. 1, 2012

(65) Prior Publication Data

US 2013/0193811 A1    Aug. 1, 2013

(51) Int. Cl.
    *H02K 17/16*      (2006.01)
    *H02K 15/00*      (2006.01)
    *H02K 9/06*       (2006.01)

(52) U.S. Cl.
    CPC .......... *H02K 15/0012* (2013.01); *H02K 17/165* (2013.01); *H02K 9/06* (2013.01)

(58) Field of Classification Search
    CPC ..... H02K 17/16; H02K 17/165; H02K 17/18; H02K 17/185; H02K 17/20; H02K 17/205
    USPC .................. 310/211, 212, 216.113, 216.114, 310/216.116, 216.121–216.124, 261, 310/400–433
    IPC ............................................ H02K 17/16, 17/18
    See application file for complete search history.

(56) References Cited

U.S. PATENT DOCUMENTS

| | | | | |
|---|---|---|---|---|
| 2,740,910 | A | * | 4/1956 | Fleischer ...................... 310/211 |
| 3,335,308 | A | * | 8/1967 | Robinson ...................... 310/211 |
| 3,535,568 | A | * | 10/1970 | Haverkamp ................... 310/77 |
| 3,612,925 | A | * | 10/1971 | Swanke ........................ 310/211 |
| 3,694,906 | A | * | 10/1972 | Rank et al. ....................... 29/598 |
| 3,783,317 | A | | 1/1974 | Sisk |
| 4,309,635 | A | | 1/1982 | Sei et al. |

(Continued)

FOREIGN PATENT DOCUMENTS

| | | | |
|---|---|---|---|
| DE | 4308683 A1 | * 9/1994 | |
| JP | 55100048 A | * 7/1980 | ............. H02K 17/16 |

(Continued)

OTHER PUBLICATIONS

Machine Translation, Kosaka, JP 05161310 A, Jun. 25, 1993.*

(Continued)

*Primary Examiner* — Thomas Truong

(74) *Attorney, Agent, or Firm* — Bose McKinney & Evans LLP

(57) ABSTRACT

An induction rotor includes a rotor core having an axial end surface, an end ring proximate the axial end surface that provides electrical communication between respective ends of conductor bars extending through the rotor core, and an end ring support structure that includes a ring member at least partially embedded in the end ring. An end ring support structure may have at least one axially extending member coupled with the ring member, such axially extending member projecting axially inwardly of the axial end surface and engaging the rotor core. An end ring support structure may include a ring member having an axially extending portion embedded in the end ring between radially inner and outer surfaces of the end ring whereby the end ring includes an outer portion, radially outwardly of the axially extending portion, and an inner portion disposed radially inwardly of the axially extending portion of the ring member.

5 Claims, 6 Drawing Sheets

(56) References Cited

U.S. PATENT DOCUMENTS

| | | | |
|---|---|---|---|
| 4,393,344 A | 7/1983 | Whellams | |
| 4,618,791 A * | 10/1986 | Morrill et al. | 310/90 |
| 4,625,392 A | 12/1986 | Stokes | |
| 4,843,705 A | 7/1989 | Aussieker et al. | |
| 4,922,144 A | 5/1990 | Baker et al. | |
| 4,947,539 A | 8/1990 | Aussieker et al. | |
| 4,970,424 A | 11/1990 | Nakamura et al. | |
| 5,349,742 A | 9/1994 | Nolle | |
| 5,793,138 A | 8/1998 | Kliman et al. | |
| 5,952,757 A | 9/1999 | Boyd, Jr. | |
| 5,990,595 A | 11/1999 | Crowell | |
| 6,088,906 A | 7/2000 | Hsu et al. | |
| 6,177,750 B1 | 1/2001 | Tompkin | |
| 6,459,189 B1 | 10/2002 | Lloyd | |
| 6,777,847 B1 | 8/2004 | Saban et al. | |
| 6,844,652 B1 | 1/2005 | Chu et al. | |
| 6,998,752 B2 | 2/2006 | Yasuhara et al. | |
| 7,019,428 B2 | 3/2006 | Sato | |
| 7,504,756 B2 | 3/2009 | Caprio et al. | |
| 7,791,240 B2 | 9/2010 | Alfermann et al. | |
| 2003/0062786 A1 | 4/2003 | Reiter, Jr. et al. | |
| 2010/0079029 A1* | 4/2010 | Muller | 310/216.114 |
| 2010/0102666 A1 | 4/2010 | Kaiser et al. | |
| 2010/0171387 A1 | 7/2010 | Czebiniak | |
| 2010/0243197 A1 | 9/2010 | Osborne et al. | |
| 2011/0163627 A1 | 7/2011 | Wang | |
| 2011/0175484 A1 | 7/2011 | Wang et al. | |
| 2011/0198964 A1 | 8/2011 | Biederman et al. | |
| 2011/0254400 A1 | 10/2011 | Vallejo | |

FOREIGN PATENT DOCUMENTS

| | | | |
|---|---|---|---|
| JP | 05161310 A * | 6/1993 | |
| JP | 2011 78158 | 4/2011 | |

OTHER PUBLICATIONS

Machine Translation, Brandes, DE 4308683 A1, Sep. 22, 1994.*
USPTO Translation, Itou, JP 55100048 A, Jul. 30, 1980.*
U.S. Appl. No. 13/326,848, filed Dec. 15, 2011 by Dragon et al. entitled Induction Rotor Retention Structure, 25 pages.

* cited by examiner

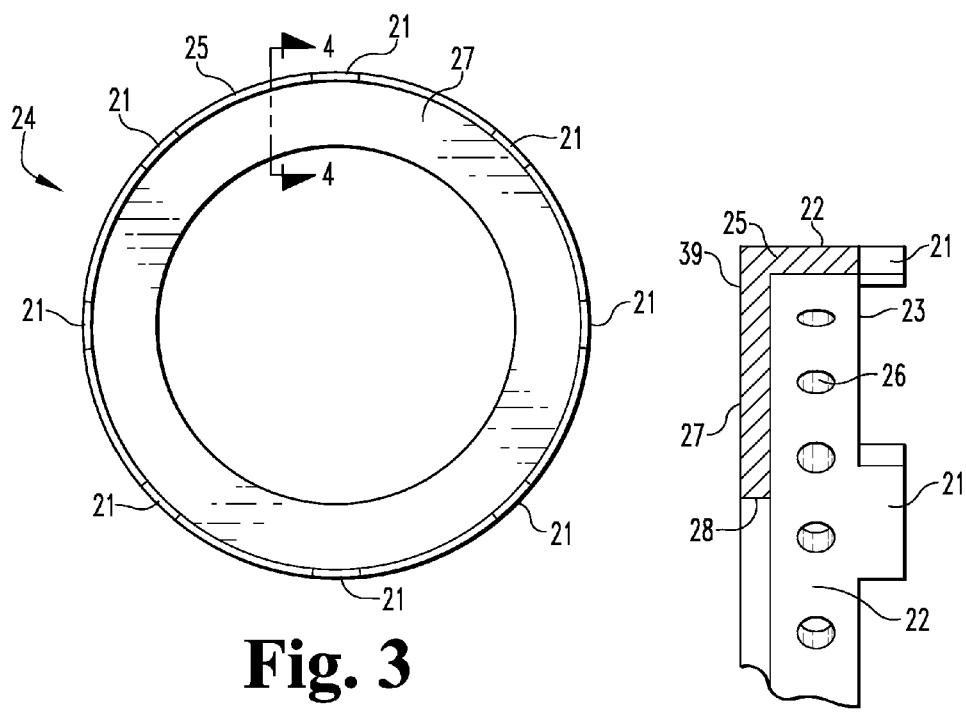
Fig. 3
Fig. 4
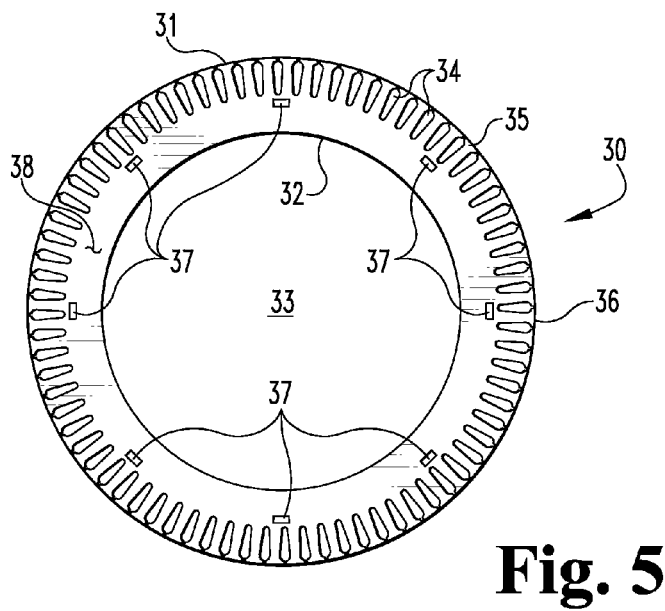
Fig. 5

INDUCTION ROTOR END RING SUPPORT DEVICE

BACKGROUND

The present invention relates generally to performance improvement of induction type electric machines and, more particularly, to structure and geometry of the end ring of an induction rotor being operated at high speed and high temperature relative to the material properties of the end ring.

An induction motor is an asynchronous electric machine powered by alternating current (AC), where such power is induced in a rotor via electromagnetic induction. For example, polyphase AC currents may be provided to stator windings structured to create a rotating magnetic field that induces current in conductors of a rotor, whereby interaction between such induced currents and the magnetic fields causes the rotor to rotate. Induction motors may have any number of phases. An induction motor may operate as a generator or traction motor, for example when driven at a negative slip.

Rotors of induction motors may conventionally include a cage such as a squirrel cage having axially parallel or skewed conductor bars of copper or aluminum extending between opposite rotor ends and positioned at radially outward locations along the circumference of the rotor. Distal ends of individual conductor bars may be provided with structural support and be in electrical communication with one another by connection of the respective bar ends to one or more continuous end rings disposed at each rotor end. The rotor may have a substantially cylindrical iron core formed as a stack of individual laminated disks of a silicon steel material. Each core disk may have axial slots for passing the copper or aluminum bars therethrough when the slots are in alignment with one another.

Due to the high costs associated with permanent magnet electric motors, electric machines for many different applications are being redesigned to utilize induction rotors. However, conventional die-cast induction rotors may have a reduced number of applications due to poor mechanical properties of the chosen die-cast material, especially when structural weakness is exacerbated by the size and speed of the rotor. Conventional induction machines may utilize varying grades of aluminum or copper in die-casting the end rings/plates and the conductor bars of the cage as an integral unit. Depending on the grade, the cast material strength may vary significantly. Such variation may be the result of achieving other material properties, for example those related to thermal conductivity, electrical conductivity, suitability for die-casting, etc.

When an induction motor is utilized in a given application such as automotive, the rotor must tolerate high speed rotation and associated large centrifugal force. In addition, high temperatures, potential metal fatigue, and other factors may aggregate with forces acting in a radial outward direction and those acting in an axial direction to cause structural breakdown resulting in damage or deformation of the cast end rings of a rotor. For example, an induction rotor generates higher temperatures within the rotor itself, further reducing mechanical and structural integrity of end rings.

SUMMARY

It is therefore desirable to obviate the above-mentioned disadvantages by providing a rotor for an induction motor, the rotor having a structure that enables a high speed operation in a high temperature ambient environment. It is also advantageous to provide a method and structure for retaining the die-cast material of an induction rotor, specifically in end ring portions of the rotor. It is also desirable to provide a method and structure that improves efficiency of an induction rotor, and that minimizes electrical losses in end ring portions of an induction rotor by maximizing the proportion of die-cast copper or other conductive material in the end ring portions while still radially and axially retaining such die-cast material. In various embodiments, it is further desirable to provide a method and apparatus whereby die-cast end ring material is radially and axially structurally supported by placing such apparatus into and/or onto an interior portion of the lamination stack of the induction rotor, and then embedding at least a portion of the apparatus within the end ring. The particular configuration and placement of the apparatus within the end ring assures that structural limitations of the die-cast material are greatly reduced.

According to an embodiment, an induction rotor includes a rotor core having an axial end surface substantially perpendicular to the axis of rotation of the rotor, a plurality of conductor bars extending through the rotor core, an end ring proximate the axial end surface and providing electrical communication between respective ends of the conductor bars, and an end ring support structure that includes a ring member at least partially embedded in the end ring and at least one axially inward extending member coupled with the ring member, the axially inward extending member projecting axially inwardly of the axial end surface. The inward projection may engage the rotor core.

According to another embodiment, an induction rotor includes a rotor core, a plurality of conductor bars extending through the rotor core, an end ring proximate an axial end of the rotor core, providing electrical communication between respective axial ends of the conductor bars and defining a radially outer surface and a radially inner surface, and a ring member having an axially extending portion embedded in the end ring between the radially inner and outer surfaces of the end ring thereby defining an end ring outer portion disposed radially outwardly of the axially extending portion and an end ring inner portion disposed radially inwardly of the axially extending portion.

According to a further embodiment, an induction rotor includes a rotor core defining a central bore and having an axial end surface substantially perpendicular to the axis of rotation of the rotor, a plurality of conductor bars extending through the rotor core, an end ring proximate the axial end surface and providing electrical communication between respective ends of the conductor bars, and an end ring support structure that includes a ring member at least partially embedded in the end ring, and at least one axially inwardly extending member coupled with the ring member and projecting axially inwardly of the axial end surface and into the central bore.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above mentioned and other features of this invention, and the manner of attaining them, will become more apparent and the invention will be better understood by reference to the following description of embodiments of the invention taken in conjunction with the accompanying drawing figures, wherein:

FIG. 3 is a plan view of a rotor end ring support device, according to an exemplary embodiment;

FIG. 4 is a cross sectional view taken along the line 4-4 of FIG. 3;

FIG. 5 is a top plan view of a lamination stack, according to an exemplary embodiment;

Figure 1:
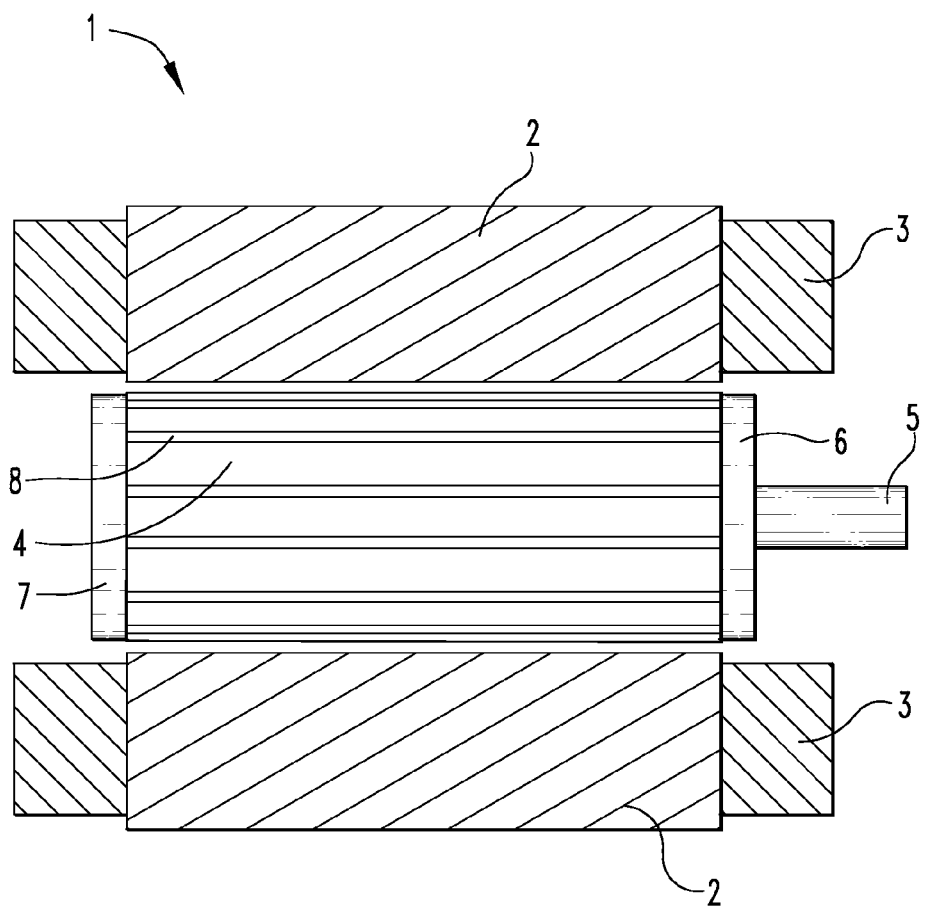
FIG. 1 is a schematic view of an electric machine.

Corresponding reference characters indicate corresponding parts throughout the several views. Although the illustrated embodiments show several forms of the invention, such embodiments are exemplary and are not intended to be exhaustive or to be construed as limiting the scope of the invention to the precise forms or applications disclosed.

DETAILED DESCRIPTION

FIG. 1 is a schematic view of an electric machine 1 such an induction motor / generator. In an exemplary embodiment, electric machine 1 may be a traction motor for a hybrid or electric type vehicle. Electric machine 1 has a stator 2 that includes a plurality of stator windings 3 typically disposed in an interior portion thereof. Stator 2 may be securely mounted in a housing (not shown) having a plurality of longitudinally extending fins formed to be spaced from one another on an external surface thereof for dissipating heat produced in the stator windings 3. For example, stator 2 may have a non-magnetic, electrically non-conductive bobbin (not shown) wound with separate phase coils. A rotor 4 has a center shaft 5 and is concentrically mounted within stator 2 so that rotor 4 rotates circumferentially respecting a longitudinal axis of shaft 5. Rotor 4 has a front end ring portion 6 and a rear end ring portion 7 respectively disposed at opposite axial ends of rotor 4, each being formed by a process that includes die-casting. When a voltage from an external power source (not shown) is supplied to the stator windings, stator 2 produces a rotating magnetic field. In operation, voltage is impressed on rotor 4 as an induced voltage. The inductive interaction of the rotating magnetic field with longitudinally extending conductive bars 8 of rotor 4 causes rotor 4 to rotate.

Figure 2:
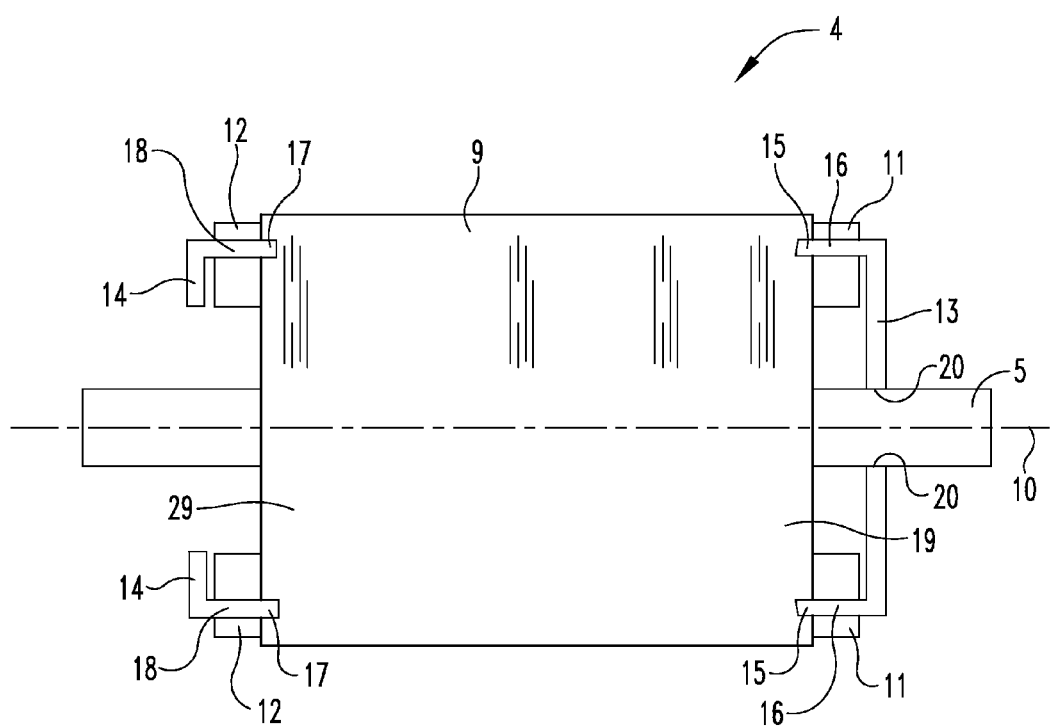
FIG. 2 is a partial cross section view of an induction rotor, according to an exemplary embodiment.

FIG. 2 is a partial cross section view of an exemplary induction rotor 4 having a rotor body 9 formed by stacking individual steel laminations into a lamination stack. For illustration purposes, various annular components have a common center axis 10 and are shown only as such annular components meet an axial plane that bisects rotor 4. An annular front end ring 11 and an annular rear end ring 12 are typically formed by a die-casting process after assembly of rotor body 9, and are electrically connected to one another via a number of individual axially-extending conductor rods or bars. Depending upon the chosen rotor application, conductor bars 8 may be formed to have any specified radially extending cross section dimension from an outside diameter of rotor 4 to a radial location proximate the inside diameter of the rotor 4. End rings 11, 12 and conductor bars 8 (e.g., FIG. 1) may be formed of a casting material which may include, but is not limited to, copper or aluminum. Prior to the formation of end rings 11, 12, an annular front end ring support device 13 is secured to a front axial end 19 of rotor body 9 and an annular rear end ring support device 14 is secured to a rear axial end 29 of rotor body 9. An insertion end 15 of front support device 13 is installed into rotor body 9, for example by placement into the stack of laminations. An insertion end 17 of rear support device 14 is installed into rotor body 9, for example by placement into the stack of laminations. Slots may be formed in individual laminations for receiving either insertion end 15, 17, and either end 15, 17 may be formed as a series of tabs, as is discussed further below. Alternatively, either of insertion ends 15, 17 may be placed in abutment with an interior portion of rotor body 9. Front end ring support device 13 has an annular, radially-inward surface 20 that abuts shaft 5, for example allowing front end ring support device 13 to be press fit onto shaft 5, or when shaft 5 is installed after a die-casting process and interior surface 20 and shaft 5 structurally support one another. After front and rear support devices 13, 14 have been installed, end rings 11, 12 are formed by die-casting, thereby embedding at least a portion of axially-extending member 16 into front end ring 11 and embedding at least a portion of axially-extending member 18 into rear end ring 12.

FIG. 5 is a top plan view of an induction motor rotor lamination stack 30 formed by stacking individual laminations, each typically made of steel sheet metal and generally shaped as a ring or disk. The laminations may be formed, for example, by a stamping operation. When assembled, lamination stack 30 has a generally columnar shape around central longitudinal axis 10. The laminations are each formed so that assembled lamination stack 30 has a uniform center aperture 33 within which shaft 5 and associated structure may be positioned. Spaces 34 are typically formed around the periphery of each lamination so that when the laminations are placed in registration with one another by forming lamination stack 30, such spaces form corresponding continuous passages each extending in a generally lengthwise direction through lamination stack 30 proximate the radially outward exterior surface 31. Such passages may be substantially parallel with central longitudinal axis 10 of rotor 4 or they may be skewed. An assembly of laminations may be formed/stacked as a spiral. These passages are used as molds for subsequently forming the plurality of the axially-extending or skewed conductor rods/bars integrally with the end rings, for example as a die-cast squirrel cage.

In order to reduce vibration, magnetic noise, and unwanted linear and radial movement of the laminations, and/or to reduce adverse effects of variations in dimensions (e.g., thicknesses) of individual laminations, lamination stack 30 may be formed with incremental variations in the shapes of individual laminations. In addition, for example, the laminations may be arranged in groups prior to stack assembly and such groups may include slight variations in shapes of individual teeth 35, whereby a particular resonance is avoided or a receptance distribution is altered. Lamination stack 30 may be formed with structure physically attached to individual laminations or to stack 30 in order to modify the corresponding electromagnetic profile. An assembly of lamination stack 30 may include bolting, riveting, welding, brazing, bonding, clamping, or staking, whereby mass distribution, elastic distribution, damping, and electromagnetic profile are affected. The electromagnetic structure may also be affected, for example, by selection of the particular interference fit used for staking adjacent laminations, and by the amount of force used by a staking punch for radially compressing a boss (not shown) of a lamination within a hole of an adjacent lamination. In exemplary FIG. 5, at least one slotted lamination 36 is placed at the axial end of lamination stack 30. Lamination 36 includes a plurality of essentially rectangular slots 37 each having respective longitudinal sides that are orthogonally aligned with respect to the associated radius of lamination 36 that bisects such longitudinal side. Slots 37 may thereby be formed radially inwardly of the respective spaces 34. In various embodiments, slots 37 may be formed to have any shape and may be located in any appropriate portion(s) of end lamination 36. In various embodiments, the axial endmost lamination(s) may have one or more slots or none at all.

FIG. 3 is a plan view of an exemplary end ring support device 24, and FIG. 4 is a cross section view taken along the line 4-4 of FIG. 3. End ring support device 24 may be formed of cast stainless steel, or other suitable material that is essentially non-magnetic to avoid generating losses in end rings 11, 12 of rotor 4. Casting of end ring support device 24 may allow implementation of various geometries not easily obtained by other processes such as stamping. As shown, an axially extending outer ring 25 has eight equally spaced tab portions 21, each having a rectangular cross section with essentially the same shape as the rectangle-shaped slots 37 of slotted lamination 36. Thereby, when end ring support device 24 is properly aligned with lamination stack 30, tabs 21 may be inserted into respective ones of slots 37, and support device 24 may be pressed against lamination stack 30 until an axially inward surface 23 of non-tab portion 22 is flush with the top surface 38 of end lamination 36. Typically, annular outer ring 25 has an outer diameter less than the diameter of the outer surface 31 of lamination stack 30, whereby outer ring 25 is radially inward of spaces 34 when support device 24 is mounted onto lamination stack 30. The annular, axially extending non-tab portion 22 of outer ring 25 has radially extending holes 26 formed therein. Holes 26 allow cast material such as copper to flow therethrough during die-casting of end ring 11, 12, so that the electrical current-carrying capacity of end rings 11, 12 is increased as a result of increasing the amount of copper connecting the respective portions of end rings 11, 12 on radially inward and outward sides of support device 24. Such increases the efficiency of induction rotor 4. Holes 26 may extend radially through outer ring 25 or they may be skewed, i.e., at an angle with respect to corresponding radii. Bores of individual holes 26 may be annular or may have any other shape or profile. An annular, radially inward extending portion 27 of end ring support device 24 has an axially outward surface 39 and a radially inward facing surface 28. Extending portion 27 may extend radially inward for a radial distance specified for a given application, as discussed further below. For example, extending portion 27 may extend radially inward so that surface 28 defines a shaft engagement surface 20 that abuts shaft 5, as shown for front end ring support device 13 of FIG. 2. In another example, extending portion 27 may extend radially inward so that annular surface 28 is radially aligned with the annular radially inward surface of end ring 12, as shown for rear end ring support device 14 of FIG. 2.

Figure 6:
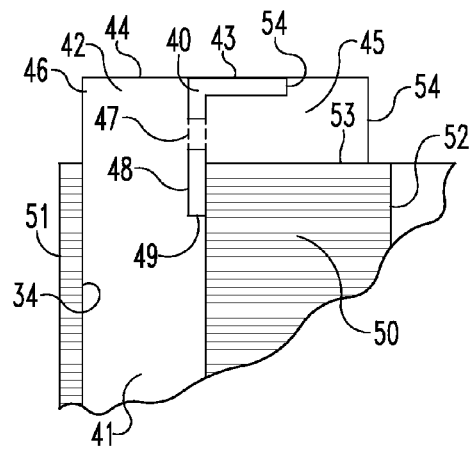
FIG. 6 is a cross sectional view of an axial end portion of an induction rotor, the end portion including an end ring support device, according to an exemplary embodiment.

FIG. 6 is a cross section view of a radially outward portion of an axial end of an induction rotor 4, according to an exemplary embodiment. An end ring support device 40 has an axially inward extending portion 48 that includes, for example, an annular portion and at least one tab inserted into space 34 of a lamination stack 50. Typically, one or more of the axially endmost laminations of lamination stack 50 may have a number of enlarged spaces 34 for receiving a corresponding number of tabs. In such a case, the enlargement of a selected number of spaces 34 may only minimally affect the volume of cast copper material in the corresponding conductor bars 41 subsequently-formed in these enlarged spaces. This subsequent die-casting process forms end ring 42 integrally with conductor bars 41, thereby embedding at least a portion of support device 40 within end ring 42. An annular, axially outward surface 43 of support device 40 may be exposed at an axial end of rotor 4, may be coplanar with an annular, axially outward surface 44 of end ring 42, or it may be fully embedded within end ring 42. Annular end ring support device 40 thereby separates end ring 40 into a radially inward portion 45 and a radially outward portion 46. Portions 45, 46 are integral with one another as a result of holes 47 formed around the circumference of the annular portion of axially extending portion 48, whereby the copper flows into holes 47 during die-casting so that the electrical communication of the resultant end ring portions 45, 46 via the copper-filled holes 47 increases the current-carrying capacity and efficiency of end ring 42. Holes 47 are typically formed to maximize such current carrying capacity while simultaneously optimizing axial and radial structural support of die-cast end ring 42. Holes 47 may be spaced evenly apart from one another around annular axially inward extending portion 48. The distal tab end(s) 49 extend axially inward into lamination stack 50 to further increase such structural support, and the radially inward facing surface(s) of axially inward extending portions 48 may snugly fit against respective radially inner lamination surface(s) of space 34, for example with a press fit, to provide additional structural support. Lamination stack 50 has a radially outward surface 51, a radially inward surface 52, and two axially outward surfaces 53. Depending on the application, the radially inward surface 54 of support device 40 may be embedded in end ring 42, may extend radially inwardly of end ring 42, and/or may extend radially inwardly of radially inward surface 52 of lamination stack 50. The radially inward surface 54 of end ring 42 is typically radially outward of the radially inward surface 52 of lamination stack 50.

Figure 7:
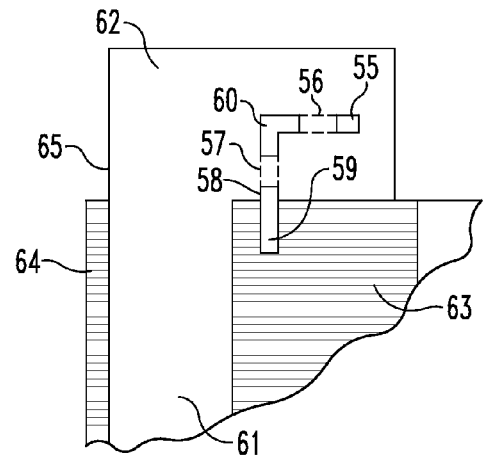
FIG. 7 is a cross sectional view of an axial end portion of an induction rotor, the end portion including an end ring support device, according to an exemplary embodiment.

FIG. 7 is a cross section view of a radially outward portion of an axial end of an induction rotor 4, according to an exemplary embodiment. An end ring support device 60 is formed in a same or similar manner as support device 40, except that support device 60 has one or more holes 56 formed in a radially inward extending portion 55. Holes 56 may be spaced evenly apart from one another around annular radially inward extending portion 55. At least one hole 57 is formed in the annular portion of the axially inward extending portion 58. Typically, holes 57 are evenly spaced apart from one another around the circumference of such annular portion. Axially inward extending portion 58 may be formed to be uniformly annular or it may be formed with one or more tabs in distal end portion(s) 59. When distal end portion 59 is at least partially annular, at least some of the individual laminations of lamination stack 63 have corresponding arc-shaped slots (not shown) for receiving respective ones of such annular portions of distal end 59. Optionally, distal end(s) 59 may be formed with a rectangle-shaped or otherwise-shaped cross section(s), and corresponding receiving slots may be formed in appropriate individual laminations of lamination stack 63. Any of the holes 56 or bores thereof may be axial or skewed, and any of the holes 57 or bores thereof may be radial or skewed. When the conductor bars 61 and end ring 62 are integrally formed in a die-casting process, the copper fills holes 56, 57, thereby increasing current-carrying capability and operational efficiency of end ring 62. After the die-casting process, the radially outward teeth 64 of lamination stack 63 are typically machined away to expose corresponding radially outward surfaces 65 of individual conductor bars 61.

Figure 8A:
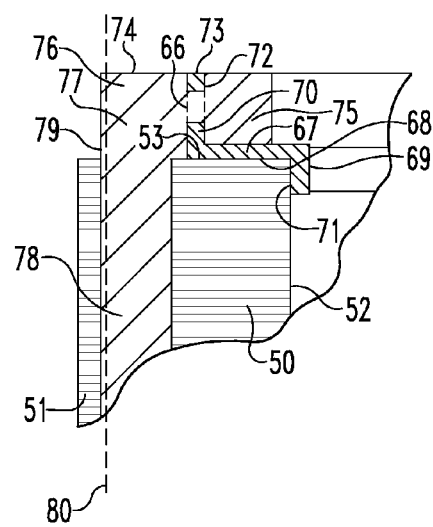
FIGS. 8A-8E are respective cross sectional views of an axial end portion of an induction rotor, the end portion including an end ring support device, according to exemplary embodiments.

FIG. 8A is a cross section view of a radially outward portion of an axial end of an induction rotor 4, according to an exemplary embodiment. An end ring support device 70 has an annular, radially extending center portion 67 having an axially inward facing surface 68. When support device 70 has been positioned prior to a die-casting process, annular surface 68 typically abuts the axially outward surface 53 of lamination stack 50. Center portion 67 is integral with an annular, axially inward extending portion 69 that has an annular, radially outward facing surface 71. When end ring support device 70 is positioned for the subsequent die-casting process, typically annular surface 71 is in substantially continuous snug abutment with the annular, radially inward surface 52 of lamination stack 50. For example, such abutting engagement may include axially press fitting the support device 70 onto lamination stack 50. An annular, axially outward extending portion 72 is integral with center portion 67, and may have at least one hole 66 formed around the circumference of portion 72. When the copper flows into holes 66 during die-casting, the electrical communication between the resultant respectively inner and outer end ring portions 75, 76 via the copper-filled holes 66 increases the current-carrying capacity and efficiency of end ring 77. Holes 66 are typically formed to maximize such current carrying capacity while simultaneously optimizing axial and radial structural support of die-cast end ring 42. Holes 66 are typically spaced evenly apart from one another around annular axially outward extending portion 72, and any of the holes 66 or bores thereof may be radial or skewed. Depending on the application, the axially outer end 73 of end ring support device 70 may be embedded in end ring 77, or it may extend axially outwardly of the axially outer end surface 74 of end ring 77. Other structure for anchoring a given end ring support device to radially inward surface 52 may be utilized so long as rotor 4 remains balanced. Ancillary structure such as bushings may be adapted to cooperate with radially inward portions of a given end ring.

After lamination stack 50 has been assembled, end ring support device 70 has been axially meshed into lamination stack 50, and end rings 77 and conductor bars 78 have been die-cast, a subsequent machining operation may be performed. Such machining may remove portions of rotor 4 that are radially outward of outside diameter (O.D.) machining line 80 shown in FIG. 8. The O.D. machining removes substantial portions of the teeth 51 of lamination stack 50, removes a radially outward portion 79 of end ring(s) 77, and removes small radially outward portions of each of the conductor bars 78 so that conductor bars 78 are exposed along the exterior surface of rotor 4. Such O.D. machining may be performed for any given embodiment of an induction rotor.

Figure 8B:
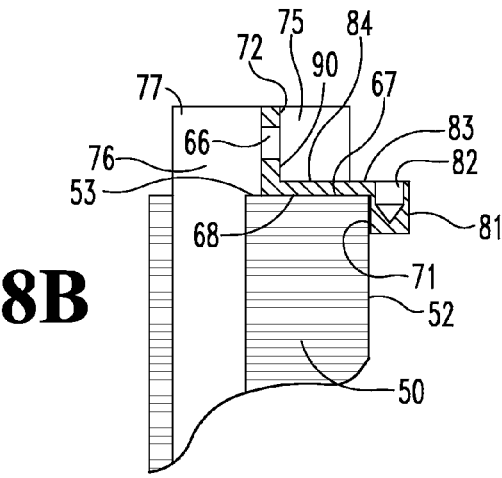

FIG. 8B is a cross section view of a radially outward portion of an axial end of an induction rotor 4, according to an exemplary embodiment. An end ring support device 90 is formed in essentially the same manner as end ring support device 70, except that an axially inward extending portion 81 includes one or more balance drill hole(s) 82, for example formed in an axially inward direction from an axially outward surface 83 thereof that is coextensive with a surface 84 of annular, radially extending center portion 67. Drill hole(s) 82 may be formed in an axial and/or in a radial direction. Drill holes 82 are typically spaced evenly apart from one another around annular axially outward surface 83, and any of the drill holes 82 or bores thereof may be axial, radial, or skewed. When embodiments of end ring 77 are formed of die-cast copper or aluminum having insufficient material stiffness for high-speed and high-temperature applications, this use of drill holes 82 for balancing rotor 4 prevents the high loading of rotating imbalance. Such also reduces or eliminates the need for using a separate balancing ring, trim balancing weights, and other balancing structure. For example, coarse balancing (e.g., accurate within 0.001 inches of mass center offset) of rotor 4 may be performed after assembly, such as by offset grinding of the shaft bearing journals, and trim balancing (e.g., balance corrected to within 0.0001 inches of mass center offset) may be performed by drilling and/or filling drill holes 82. The use of a balancing hole pattern (not shown) may be adapted for providing desired inertial characteristics. The trim balancing is typically governed by the diameter and depth of balance drill holes 82, and the maximum density any added weight material. In various embodiments, the substantially continuous snug abutment of radially outward facing surface 71 of end ring support device 90 with radially inward surface 52 of lamination stack 50 may be utilized for maintaining accurate centering of end ring 77 about center axis 10. Similarly, when a rotor hub (not shown) is used, radially outward facing surface 71 of an axially inward extending portion 81 may abut the inside diameter (ID) wall of such rotor hub. In such a case, the rotor hub typically fits to the lamination ID 52 and allows for a large amount of rotor lamination material to be removed from the rotor 4, thereby reducing weight and inertia. Annular, axially outward extending portion 72 may have at least one hole 66 formed around the circumference thereof. Other structure for anchoring a given end ring support device to radially inward surface 52 may be utilized so long as rotor 4 remains balanced. Although axially inward surface 68 of center portion 67 is shown in abutment with the outer axial surface 53 of lamination stack 50, in various embodiments portions of surfaces 68, 53 may be contiguous while other such portions may be offset from one another.

Figure 8C:
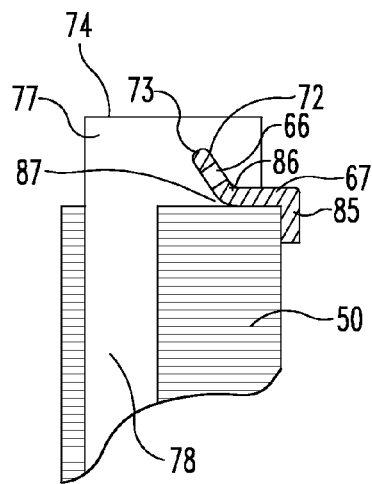

FIG. 8C is a cross section view of a radially outward portion of an axial end of an induction rotor 4, according to an exemplary embodiment. An end ring support device 85 is formed in essentially the same manner as end ring support devices 70, 90 except that axially outward extending portion 72 extends away from center portion 67 at an angle other than a right angle, for example forming an obtuse angle at an apex portion 86. By utilization of such obtuse angle at apex 86, the die-casting of end ring 77 forms an additional annular, radially outward end ring portion 87 in proximity to conductor bars 78, thereby increasing the efficiency of rotor 4. In operation, the annular angled axially outward extending portion 72 with radially extending via holes 66 acts to provide both axial and radial retention of end ring 77. Annular, axially outward extending portion 72 is integral with center portion 67, and may have at least one hole 66 formed around the circumference of portion 72. Depending on the application, the axially outer end 73 of end ring support device 85 may be embedded in end ring 77, or it may extend axially outwardly of the axially outer end surface 74 of end ring 77.

Figure 8D:
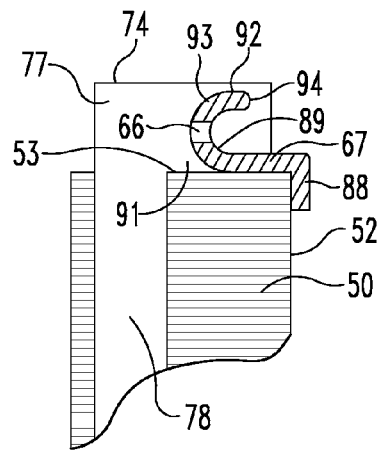

FIG. 8D is a cross section view of a radially outward portion of an axial end of an induction rotor 4, according to an exemplary embodiment. An end ring support device 88 is formed in essentially the same manner as end ring support devices 70, 85, 90 except that as annular center portion 67 extends radially outward, it is curved 180 degrees, first away from the outer axial surface 53 of lamination stack 50 (when installed) in a generally axial direction and finally back in a radially inward direction toward inner radial surface 52 of lamination stack 50. Thereby, a generally "U-shaped" annular portion 89 has an open end facing generally radially inward. A number of evenly spaced holes 66 are typically formed along the periphery of annular U-shaped portion 89 for flowing copper or other end ring material there through during die-casting, thereby increasing the current-carrying capacity and efficiency while simultaneously optimizing axial and radial structural support of die-cast end ring 77. By utilization of U-shaped portion 89, the die-casting of end ring 77 forms an additional annular, radially outward end ring portion 91 in proximity to conductor bars 78, thereby further increasing the efficiency of rotor 4. Depending on the application, the axially outer surface 92 of end ring support device 88 may be embedded in end ring 77, or it may extend axially outwardly of the axially outer end surface 74 end surface of end ring 77. The annular portion 93 extending axially outward of holes 66 may be variously shaped, for example to taper/expand, as it extends a given distance radially inwardly to annular end 94.

Figure 8E:
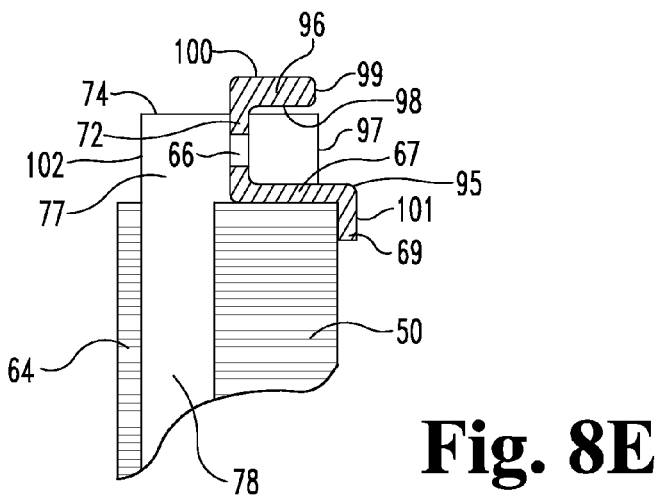
Figure 9:
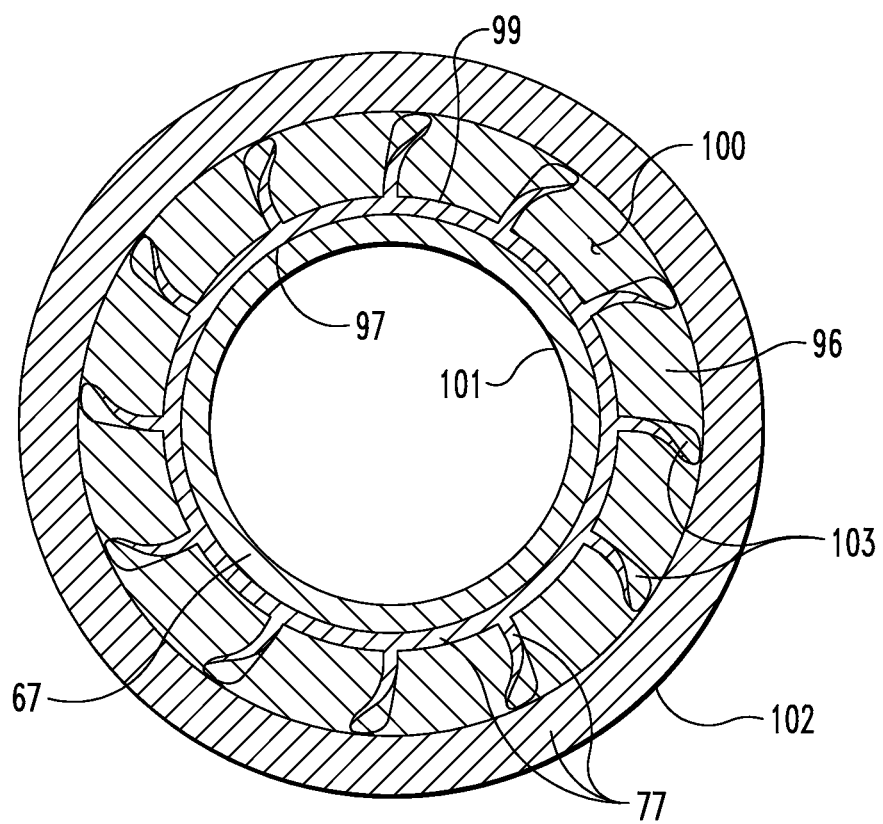
FIG. 9 is a top view of an end ring support device cast into the end ring of an induction motor, according to an exemplary embodiment.

FIG. 8E is a cross section view of a radially outward portion of an axial end of an induction rotor 4, according to an exemplary embodiment. An end ring support device 95 is formed in essentially the same manner as end ring support device 70 except that an approximately annular, external end portion 96 extends axially outwardly of the axially outer end surface 74 of end ring 77 and then radially inwardly of annular axially outward extending portion 72. The axially inward surface 98 of external end portion 96 is spaced away from top surface 74 of end ring 77, so that when rotor 4 rotates during operation of electric machine 1, external end portion 96 acts as a fan for cooling machine 1. Although axial end surface 100 is shown by example in FIG. 8E as being essentially parallel with end ring surface 74, typically external end portion 96 is formed as an external end portion 106 having a plurality of blades 103, as shown in FIG. 9. Blades 103 may be formed in any appropriate manner, whereby exterior end portion 106, for example, may include individual tilted blade portions 103 that extend at an angle away from a plane orthogonal to center axis 10. Such individual tilted blades 103 may be formed, for example, by punching radial serrations in axial end surface 100 at equally spaced intervals and then pressing the resultant individual blades 103 into a desired shape such as curved, tilted radially and/or axially, raised, lowered, and others. In some applications, the radial inner surface 99 of external end portion 106 may extend radially inwardly of the radial inner surface 97 of end ring 77, and may even extend radially inwardly of the radially inward surface 101 of axially inward extending portion 69, for example by extending to engage shaft 5 (e.g., FIG. 2). In FIG. 9, the radially outer surface 102 of end ring 77 is shown by example with the radially outer portion 64 of lamination stack 50 removed, such as by O.D. machining that exposes conductor bars 78. Annular, axially outward extending portion 72 may have at least one hole 66 formed around the circumference thereof, and typically has a plurality of holes 66 evenly spaced around the circumference of portion 72.

The various embodiments may advantageously maximize the copper mass of end rings in proximity to conductor bars while simultaneously preventing axial and radial movement/deformation of die-cast end rings. By increasing the amount of copper or other cast material such as aluminum in the end rings, the current conduction path and associated rotor efficiency are increased. By inserting a projecting portion of an annular end ring support device into a lamination stack, the structural integrity and the ease of manufacturing of an induction rotor 4 are increased. A protruding portion or other engaging portion of the end ring support device may extend in an axial plane and/or in a radial plane perpendicular to the rotational axis of induction rotor 4, or such engaging portions may optionally extend in a skewed direction.

In various embodiments, for example, the end ring support device is typically registered with the lamination stack by simply piloting a portion of the support device into the end laminations of the lamination stack. Alternatively, a given end ring support device may be registered with the lamination stack by use of alignment tooling that positions a first end ring support device in the tooling, that positions a first axial end of the lamination stack on top of the first support device, and that positions a second end ring support device on the other axial end of the lamination stack. However, such alternative registration of the end ring support device with the lamination stack may require ancillary tooling and associated calibration. In either case, the aligned assembly is typically axially pressed together so that the squirrel cage or other conductive structure of an induction rotor may then be formed by die-casting.

In various embodiments, for example, it may be advantageous that the same or similar respective structural portions of front and rear end ring portions 6, 7 be angularly offset from one another so that electromagnetic resonance (e.g., high frequency noise) is avoided by reducing occurrences of asymmetric poles aligning with one another, and so that other operational distortion such as imbalance is reduced. For example, holes filled with copper and radially extending through a portion of a front end ring support device may be angularly offset with respect to the same or similar copper-filled holes of a rear end ring support device. In another example, axially extending tabs for securing a front end ring support device to a lamination stack may be angularly centered between corresponding tabs of a rear end ring support device, or they may be aligned with one another, depending on mechanical balancing of the rotor.

In various applications, an annular portion of the end ring is formed radially outward of the support device, such as in the illustrated embodiments of FIGS. 6-9. The structural support of such end rings being provided by the respective end ring support device is sufficient for the particular induction rotor application. For example, the radially outward and axially outward operational loading of the end ring is greatly reduced by the significant amounts of bent metal in the support device being embedded in the die-cast end ring. When the copper or other conductive casting material is molded in and around the end ring support device, the structural integrity of the end ring is typically well beyond what is necessary. For example, depending upon the rotor speed and ambient temperature, the partial end ring support being provided by the end ring support device may result in an eighty percent or greater reduction in loading of a given end ring when only a ten percent loading reduction is required to maintain structural integrity under worst case operational conditions. In such a case, the volume of copper that is radially outward of the end ring support device is sufficiently supported to avoid deformation due to centrifugal force during rotor operation.

The disclosed embodiments provide solutions to conventional problems associated with high speed, high temperature operation of an induction motor and resultant deformation of end ring portions formed, for example, using copper or aluminum. Such end ring materials have high electrical conductivity but they prove to be insufficient for being formed into a structure that will be self-supporting and that maintains structural integrity under designed operating conditions. The disclosed embodiments illustrate several forms (geometry) that may be utilized in an end ring support device to provide the necessary structural support to the induction rotor end rings being subjected to high speed, high temperature rotor operation. The end ring support devices may be manufactured in any appropriate manner, such as by stamping, casting, etc.

The various disclosed features may be combined with known materials and structure, for example during the die-casting process. In addition, the various features and structure of the disclosed embodiments may be configured to cooperate in combination with the end ring material and with adjacent structure of the rotor 4 for maintaining structural integrity.

Various features and structure of exemplary end ring support devices 24, 40, 60, 70, 85, 88, 90, 95 are not exclusive to the illustrated embodiments but may be selectively combined where appropriate for a given application. An end ring support device for a given application may be formed, in whole or in part, in any appropriate manner.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. An induction rotor, comprising:
   a rotor core defining a central bore and having an axial end surface substantially perpendicular to an axis of rotation of the rotor;
   a plurality of conductor bars extending through the rotor core;
   an end ring proximate the axial end surface and providing electrical communication between respective ends of the conductor bars; and
   an end ring support structure including:
      a ring member at least partially embedded in the end ring;
      at least one axially inwardly extending member coupled with the ring member and projecting axially inwardly of the axial end surface and into the central bore;
      a radially extending center portion which abuttingly engages the rotor core and is at least partially embedded in the end ring, the center portion interconnecting the ring member and the at least one axially inwardly extending member; and
      wherein the axially inwardly extending member defines a radially outward facing surface that abuttingly engages a radially inward facing surface within the central bore.

2. The rotor according to claim 1, wherein the end ring support structure further comprises an annular axially outwardly extending portion radially bisecting at least a portion of the end ring.

3. The rotor according to claim 2, wherein the end ring has an axial end surface and wherein the axially outwardly extending portion projects beyond such axial end surface to form external fan blades.

4. The induction rotor of claim 1 wherein the radially inward facing surface engaged by the axially inwardly extending member is defined by the rotor core and forms a portion of the central bore.

5. An induction rotor, comprising:
   a rotor core defining a central bore and having an axial end surface substantially perpendicular to an axis of rotation of the rotor;
   a plurality of conductor bars extending through the rotor core;
   an end ring proximate the axial end surface and providing electrical communication between respective ends of the conductor bars; and
   an end ring support structure including:
      a ring member at least partially embedded in the end ring;
      at least one axially inwardly extending member coupled with the ring member and projecting axially inwardly of the axial end surface and into the central bore; and
      a radially extending center portion which abuttingly engages the rotor core and is at least partially embedded in the end ring, the center portion interconnecting the ring member and the at least one axially inwardly extending member;
   wherein the end ring support structure further comprises an annular axially outwardly extending portion radially bisecting at least a portion of the end ring; and
   wherein the axially outwardly extending portion extends away from the axial end surface of the rotor core at a skewed angle to the axial end surface, whereby the end ring comprises an annular portion adjacent the conductor bars, such annular portion being axially outward of such axial end surface and axially inward of such skewed portion, and being radially inward of such end surface.

* * * * *